(12) United States Patent
Lee (10) Patent No.: US 11,174,454 B2
(45) Date of Patent: Nov. 16, 2021

(54) BEVERAGE MAKER AND METHOD FOR CONTROLLING BEVERAGE MAKER

(71) Applicant: LG ELECTRONICS INC., Seoul (KR)

(72) Inventor: Jeyeol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 16/668,461

(22) Filed: Oct. 30, 2019

(65) Prior Publication Data
US 2020/0140795 A1 May 7, 2020

(30) Foreign Application Priority Data
Nov. 5, 2018 (KR) .................. 10-2018-0134543

(51) Int. Cl.
| | |
|---|---|
| *C12C 13/10* | (2006.01) |
| *B67D 1/00* | (2006.01) |
| *C12C 11/00* | (2006.01) |
| *B67D 1/12* | (2006.01) |
| *B67D 1/08* | (2006.01) |
| *B67D 1/07* | (2006.01) |

(52) U.S. Cl.
CPC ............ *C12C 13/10* (2013.01); *B67D 1/0016* (2013.01); *B67D 1/07* (2013.01); *B67D 1/0888* (2013.01); *B67D 1/1202* (2013.01); *B67D 1/1247* (2013.01); *C12C 11/003* (2013.01)

(58) Field of Classification Search
CPC ...... B67D 1/0016; B67D 1/07; B67D 1/0888; B67D 1/1202; B67D 1/1247; C12C 13/10; C12C 11/003

USPC ...... 137/386; 99/280, 300, 305, 309; 141/95
See application file for complete search history.

(56) References Cited

U.S. PATENT DOCUMENTS

| | | | | |
|---|---|---|---|---|
| 5,181,467 | A  * | 1/1993 | Takekoshi | B01F 15/0412 101/147 |
| 6,305,267 | B1 * | 10/2001 | Rolfes | A47J 31/56 99/281 |
| 6,405,637 | B1 * | 6/2002 | Cai | A47J 31/4478 99/293 |
| 6,406,730 | B1 * | 6/2002 | Banyard | A23F 5/243 426/324 |
| 6,672,200 | B2 * | 1/2004 | Duffy | A47J 31/0642 222/146.5 |

(Continued)

*Primary Examiner* — Timothy L Maust
(74) *Attorney, Agent, or Firm* — Ked & Associates LLP (57) ABSTRACT

A beverage maker may include a fermenter having a space therein to make a beverage; a fluid tank configured to contain fluid; a fluid supply pump connected with the fluid tank; a flow rate detection sensor disposed in a channel connected with the fluid supply pump to detect a flow velocity or a flow rate of fluid which is discharged through the channel by the fluid supply pump; and a controller configured to perform a plurality of operations related to making of a beverage or cleaning of an inside of the beverage maker. The controller may be configured to when an operation requiring a supply of fluid is ongoing from among the plurality of operations, turn on the fluid supply pump to discharge fluid contained in the fluid tank; detect a lack of fluid in the fluid tank based on a first flow velocity or a first flow rate detected by the flow rate detection sensor; and generate a fluid replenishment request for the fluid tank based on a result of detecting.

18 Claims, 5 Drawing Sheets

(56) References Cited

U.S. PATENT DOCUMENTS

| | | | | |
|---|---|---|---|---|
| 7,398,726 | B2* | 7/2008 | Streeter | A47J 31/32 99/280 |
| 7,401,546 | B2* | 7/2008 | Dumm | A23C 3/031 366/149 |
| 7,503,253 | B2* | 3/2009 | Rahn | A47J 31/56 99/280 |
| 8,132,499 | B2* | 3/2012 | Lowe | A47J 31/54 99/301 |
| 8,210,396 | B2* | 7/2012 | Girard | A47J 31/402 222/129.1 |
| 8,646,377 | B2* | 2/2014 | Stieger | A47J 31/542 99/279 |
| 9,523,067 | B2* | 12/2016 | Wallace | C12C 13/10 |
| 9,700,171 | B2* | 7/2017 | Hanneson | A47J 31/3695 |
| 2006/0086387 | A1* | 4/2006 | Gupta | G05D 7/0635 137/101.25 |
| 2010/0243101 | A1* | 9/2010 | Matsumoto | B05B 15/55 141/27 |
| 2014/0197197 | A1* | 7/2014 | Kamen | C02F 1/325 222/52 |
| 2014/0208954 | A1* | 7/2014 | Starr | A47J 31/0576 99/283 |
| 2014/0299000 | A1* | 10/2014 | Hanneson | A47J 31/369 99/300 |
| 2015/0093470 | A1* | 4/2015 | Hobson | A23L 2/02 426/14 |

\* cited by examiner

BEVERAGE MAKER AND METHOD FOR CONTROLLING BEVERAGE MAKER

CROSS-REFERENCE TO RELATED APPLICATION(S)

This application claims priority under 35 U.S.C. 119 and 365 to Korean Patent Application No. 10-2018-0134543, filed in Korea on Nov. 5, 2018 in the Korean Intellectual Property Office, the disclosure of which is incorporated herein by reference.

BACKGROUND

1. Field

A beverage maker, and more particularly, a beverage maker which detects a lack of necessary water during an operation of the beverage maker is disclosed herein.

2. Background

Beverages are collectively referred to as drinkable liquids, such as alcohol or tea, for example. Beverages may be divided into various categories, such as water (a beverage) to solve thirst, juice beverages with unique flavor and taste, refreshing beverages giving a refreshing sensation, favorite beverages with an arousal effect, or alcoholic beverages with an alcohol effect, for example.

A representative example of such a beverage is beer. Beer is an alcoholic beverage produced by making juice of malt, which is made by sprouting barley, filtering the juice, adding hop, and fermenting yeast.

Consumers may purchase ready-made products made and sold by a beer maker or make beer (hereinafter "homemade beer") produced by directly fermenting beer ingredients at home or in a bar. Homemade beer may be made in a variety of types rather than ready-made products and may be made to better suit a consumer's taste.

The ingredients for making beer may include water, liquid malt, hop, yeast, and flavoring additive, for example. Leaven, which is called yeast, may be added to liquid malt to ferment the liquid malt and assist production of alcohol and carbonic acid. The flavor additives are additives that enhance the taste of beer, such as fruit, syrup, and vanilla beans, for example.

Generally, homemade beer may include three stages or operations, namely, a wort production operation, a fermentation operation, and an aging operation, and it may take about two to three weeks from the wort production operation to the aging operation. It is important for homemade beer to maintain an optimum temperature during the fermentation stage, and the more the beer is more simply made, the more user convenience is improved.

In recent years, a beverage maker capable of easily making a beer-like beverage in a home or a bar has been gradually used, and such a beverage maker is configured to be convenient.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the accompanying drawings. Wherever possible, the same or like reference numerals have been used to indicate the same or like elements, and repetitive disclosure has been omitted.

Although beer is exemplified as a beverage made using a beverage maker according to embodiments, the kind of beverage capable of being made using the beverage maker is not limited to beer. For example, various kinds of beverages may be made using the beverage maker according to embodiments.

Figure 1:
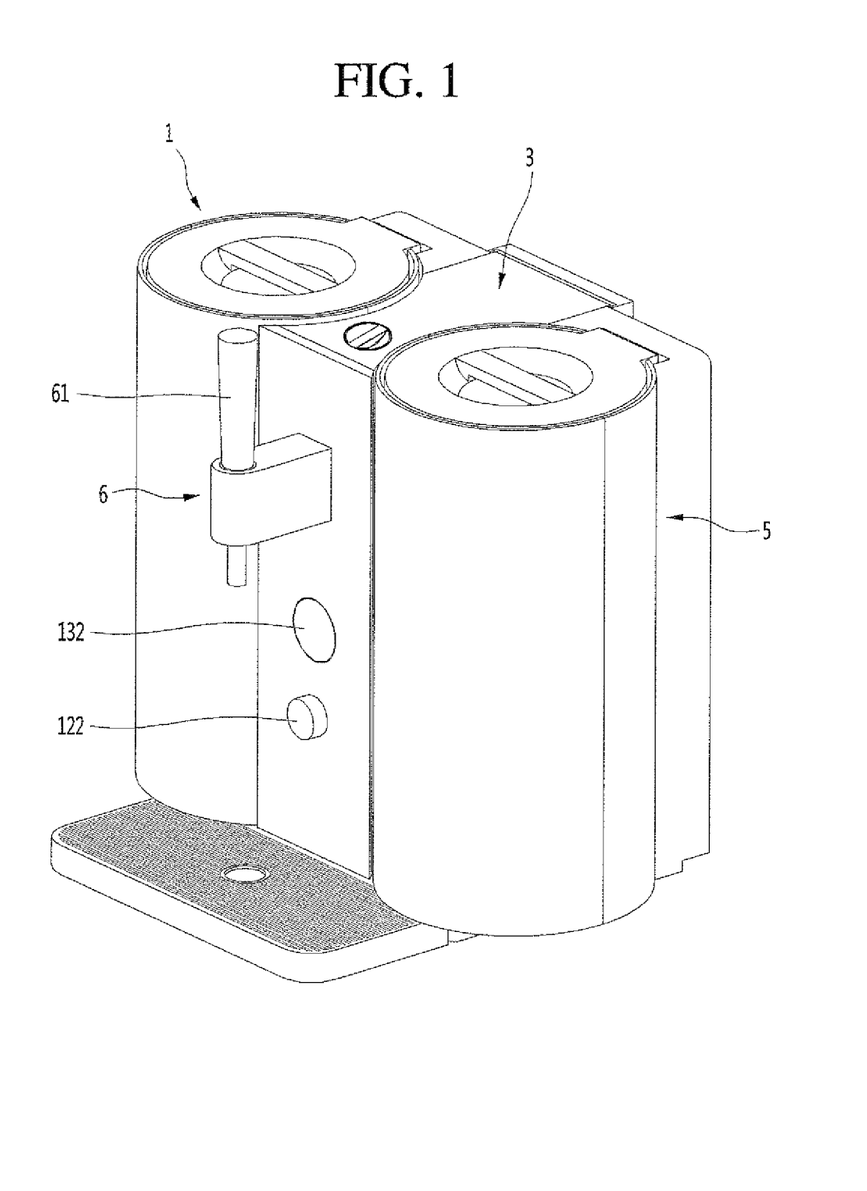
FIG. 1 is a perspective view of the beverage maker according to an embodiment.
Figure 2:
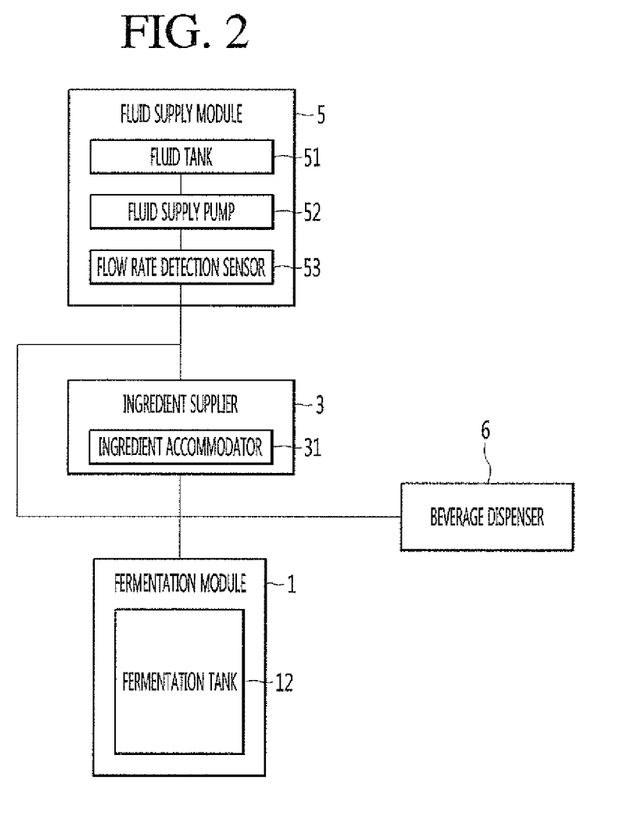
FIG. 2 is a schematic block diagram of the beverage maker according to an embodiment.

FIG. 1 is a perspective view of the beverage maker according to an embodiment. FIG. 2 is a schematic block diagram of the beverage maker according to an embodiment.

The beverage maker may include a fermentation module 1 defining a space to make a beverage therein. The beverage maker may make a beverage by performing processes or operations, such as mixing, heating, cooling, fermenting, or aging with respect to ingredients input into the fermentation module 1.

The fermentation module 1 may include a fermentation tank 12 having an inner space formed therein. That is, a beverage may be made in the fermentation tank 12, and the made beverage may be stored.

According to an embodiment, a fermentation container may be received in the fermentation tank 12. The fermentation container may refer to a container that is separately provided to prevent ingredients of a beverage and a made beverage from being stuck to an inner wall of the fermentation tank 12. The fermentation container may be removably provided in the fermentation module 1, and may be removed from the fermentation module 1 after being used. The fermentation container may be a pack containing some ingredients for making a beverage.

The beverage maker may include various components to make the beverage. For example, the beverage maker may include a thermostat to control a temperature inside of the fermentation module 1, a gas exhauster to adjust a pressure, a temperature sensor to detect a temperature inside of the fermentation module 1, and a pressure sensor to detect a pressure inside of the fermentation module 1.

The beverage maker may include an ingredient supplier 3 containing at least some of ingredients necessary for making the beverage. The ingredient supplier 3 may be connected with the fermentation module 1. Accordingly, ingredients contained in an ingredient accommodator 31 of the ingredient supplier 3 may be put into the fermentation module 1 along with a fluid, such as water supplied from a fluid supply module 5 based on an input time for each ingredient when a beverage is made.

The ingredient contained in the ingredient accommodator 31 may be contained in the ingredient accommodator 31 while being contained in an ingredient container, such as a capsule. When a plurality of ingredients is contained in the ingredient accommodator 31, a plurality of ingredient containers may be provided.

The beverage maker may include the fluid supply module 5 to supply fluid, such as water necessary for making a beverage or for cleaning an inside of the beverage maker. The fluid supply module 5 may include a fluid tank 51 defining a space to contain a fluid, such as water, and a fluid supply pump 52 to pump a fluid, such as water of the fluid tank 51.

The fluid pumped by the fluid supply pump 52 may be put into the ingredient supplier 3 and may be supplied to the fermentation module 1 along with the ingredient, or may be directly supplied to the fermentation module 1 without passing through the ingredient supplier 3. According to an embodiment, the fluid supply module 5 may include a flow rate detection sensor 53 to detect a flow velocity and a flow rate of a fluid, such as water supplied to the ingredient supplier 3 or the fermentation module 1 by the fluid supply pump 52. For example, the flow rate detection sensor 53 may be implemented using various well-known flow meters, for example, a positive displacement flow meter, or an electromagnetic flow meter, for example. The term "flow velocity" refers to a velocity of fluid which passes through a certain point per unit time, and the term "flow rate" refers to a volume of fluid which passes through a certain cross-sectional area per unit time.

The beverage maker may include a beverage dispenser 6 to dispense the beverage made in the fermentation module 1 to the outside. The beverage dispenser 6 may dispense the beverage to the outside based on an operation of a lever 61 by a user.

The beverage maker may include an input interface to receive an input of a command related to making the beverage by the beverage maker. The input interface may include at least one of a touch pad which receives an input of a user's command in a touch method, a rotary knob which is held and is rotated by the user, and/or a button which is pressed by the user, for example.

For example, the input interface may include a rotary knob 122. The rotary knob 122 may be disposed on a front surface of the beverage maker. For example, the rotary knob 122 may be disposed lower than a display 132; however, embodiments are not limiting thereto.

The rotary knob 122 may function as a button which is pressed by the user. That is, the user may input a control command by holding and turning the rotary knob 122, or pressing a front surface of the rotary knob 122.

In addition, the input interface may include a touch pad 124 (see FIG. 3) to receive an input of a user's command in a touching method. For example, the touch pad 124 may be integrally formed with the display 132. In this case, the display 132 may also function as a touch screen.

The beverage maker may include the display 132 to display a variety of information of the beverage maker. For example, the display 132 may be formed at a position where the display 132 is not hidden by the beverage dispenser 6 on the front surface of the beverage maker, such that the display 132 may be easily checked by the user with the naked eye.

Figure 3:
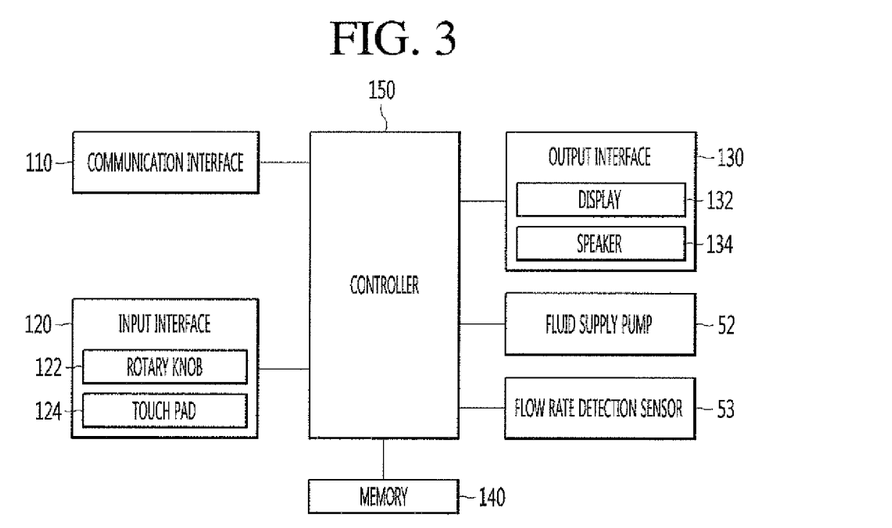
FIG. 3 is a schematic block diagram showing a control configuration of the beverage maker according to an embodiment.

FIG. 3 is a schematic block diagram showing a control configuration of the beverage maker according to an embodiment. Referring to FIG. 3, the beverage maker may include a communication interface 110, an input interface 120, an output interface 130, a memory 140, and a controller 150. The control components illustrated in FIG. 3 are not essential for implementation of the beverage maker, and the beverage maker may include more components or fewer components according to embodiments.

The beverage maker may include the communication interface 110 to communicate with a terminal, such as a smartphone, or a tablet PC, for example, or a server. For example, the controller 150 may receive a request for execution of the beverage making function from a terminal of the user, or may receive recipe information through the communication interface 110. In addition, the controller 150 may transmit a variety of information regarding operations of the beverage maker, a making state of the beverage, or a storage state to the terminal or the server through the communication interface 110, for example.

The communication interface 110 may include a module the supports at least one of already-known various wired or wireless communication methods. For example, the communication interface 110 may include a module of short-range wireless communication, such as Bluetooth, or near field communication (NFC), for example, or a wireless Internet module, such as a wireless local area network (WLAN) module, for example.

The input interface 120 may be provided to receive various requests or commands from the user. For example, the input interface 120 may include the rotary knob 122, the touch pad 124 (or touch screen), and/or other buttons or a microphone, for example. The controller 150 may receive a request for execution of the beverage making function, recipe information, and/or control commands regarding various operations of the beverage maker, for example, through the input interface 120.

The output interface 130 may output a variety of information related to an operation or a state of the beverage maker, and a variety of information related to a beverage which is being made or stored in the beverage maker. For example, the output interface 130 may include the display 132 to output the information in the form of a graphic or text, and a speaker 134 to output the information in the form of a voice; however, embodiments are not limited thereto.

More specifically, the display 132 may display various screens related to operations of the beverage maker. For example, the display 132 may display a screen including information related to a current operation of the beverage maker, various menu screens for executing a specific operation of the beverage maker, and/or a screen including information related to a beverage which is being made or stored in the beverage maker, for example.

The display 132 may be implemented using a liquid crystal display (LCD), a light emitting diode (LED) display, and/or an organic LED (OLED) display, for example. In the following description, it is assumed that the display 132 is formed in a circular shape; however, embodiments are not limited thereto and the shape of the display 132 may be freely changed.

In particular, when a lack of fluid is detected while a control operation requiring supply of fluid or a cleaning operation of an inside of the beverage maker is performed from among control operations related to making of a beverage, the controller 150 may output a screen or a sound requesting a user to replenish the fluid tank 51 with fluid, through the display 132 or the speaker 134. The user may replenish the fluid tank 51 with fluid, based on the output screen or sound.

The memory 140 may store a variety of information or data related to operations of the beverage maker. For example, the memory 140 may store predetermined recipe information regarding beverages to be made, various setting values, and/or various program data for operations of the beverage maker, for example. In addition, the memory 140 may store various graphic data related to the screens displayed through the display 132.

The controller 150 may control overall operations of the beverage maker. The controller 150 may refer to at least one controller. The at least one controller may be implemented using hardware, such as a CPU, an application processor, a micro-computer (or mi-corn), and/or an integrated circuit, for example.

The controller 150 may turn on the fluid supply pump 52 to supply fluid contained in the fluid tank 51 to the fermentation module 1 or the ingredient supplier 3 when performing the control operation requiring supply of fluid, or the operation of cleaning the inside of the beverage maker from among the control operations related to making of a beverage. In this case, the controller 150 may control the flow rate detection sensor 53 to detect a flow velocity and/or a flow rate, and may calculate an amount of supplied fluid based on the detected flow velocity and/or flow rate.

At the control operation requiring supply of fluid or the cleaning operation, the controller 150 may control the fluid supply pump 52 to supply a predetermined amount of fluid to the fermentation module 1 or the ingredient supplier 3. In this case, the predetermined amount of fluid or more may not be contained in the fluid tank 51. In this case, as the predetermined amount of fluid is not supplied, a beverage may be abnormally made, and thus, a quality of the made beverage may be degraded, or a cleaning operation may be abnormally performed, and thus, a hygiene problem may arise inside of the beverage maker.

The beverage maker according to an embodiment may detect whether there is a lack of fluid based on a flow velocity and/or a flow rate detected through the flow rate detection sensor 53. When the lack of fluid is detected, the beverage maker may stop the ongoing control operation or cleaning operation, and may induce the user to replenish the fluid, thereby preventing the above-described problems.

Embodiments related to this will be described hereinafter with reference to FIGS. 5 to 7.

Figure 4:
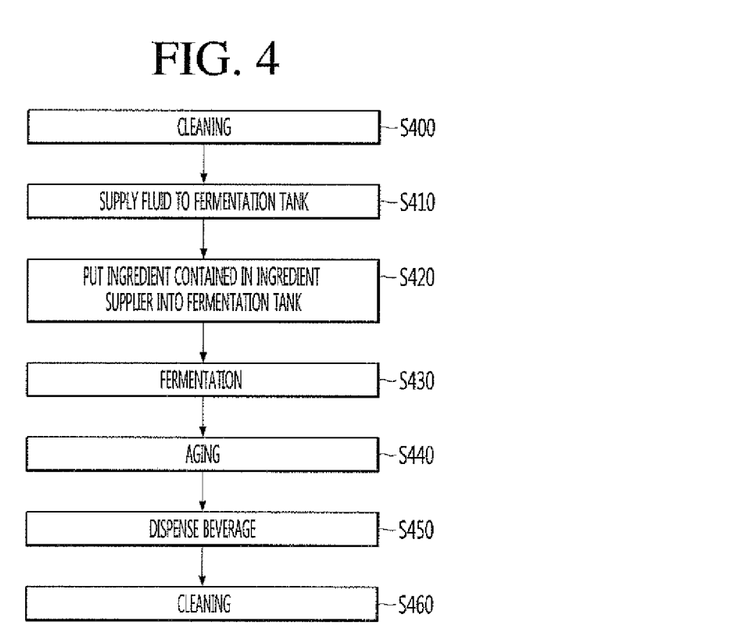
FIG. 4 is a flowchart to explain overall control operations of the beverage maker according to an embodiment.

FIG. 4 is a flowchart to explain overall control operations of the beverage maker according to an embodiment. Referring to FIG. 4, the beverage maker may perform a cleaning operation (S400, S460) of cleaning the inside, the channel, for example, of the beverage maker. The cleaning operation (S400, S460) may be performed separately from control operations related to making of a beverage. The cleaning operation (S400, S460) may be performed before or after a beverage is made.

For example, the cleaning operation (S400, S460) may be performed by a cleaning request received through the input interface 120 or the communication interface 110. Alternatively, the cleaning operation (S400, S460) may be automatically performed before or after a beverage is made according to a beverage making request received through the input interface 120 or the communication interface 110.

At the cleaning operation (S400, S460), the controller 150 may control the fluid supply pump 52 to supply fluid of the fluid tank 51 to inner channels and the ingredient supplier 3. For example, the controller 150 may control the fluid supply pump 52 to supply an amount of fluid which is pre-set or predetermined for the cleaning operation. The supplied fluid may be discharged to the outside through the beverage dispenser 6, along with foreign substances or residue existing in the channels and the ingredient accommodator 31 of the ingredient supplier 3. Alternatively, the supplied fluid may be received in the fermentation tank 12 or a cleaning container contained in the fermentation tank 12 along with foreign substances or residue, and may be discharged to the outside by the user emptying fluid out of the fermentation tank 12 or the cleaning container.

The controller 150 may perform the cleaning operation (S400, S460) for a pre-set or predetermined cleaning time, and after the pre-set or predetermined cleaning time, may complete the cleaning operation. In addition, the beverage maker may perform control operations (S410 to S440) related to making of a beverage. The control operations may be changed variously according to a type of a beverage to be made.

A control operation performed by the beverage maker is not limited to the control operations shown in FIG. 4. That is, the beverage maker may perform more control operations or fewer control operations than the control operations shown in FIG. 4.

In FIG. 4, beer is exemplified as a beverage to be made. Referring to the embodiment of FIG. 4, the beverage maker may perform a fluid supply operation (S410) of supplying fluid to the fermentation tank 12 (or the fermentation container). For example, some of ingredients of beer (malt) may be contained in the fermentation tank 12. The malt may be mixed with fluid as the fluid is supplied. According to an embodiment, when the fluid supply module 5 includes a fluid supply heater, the beverage maker may control the fluid supply heater to heat fluid, and may mix the malt and the fluid more evenly by supplying the heated fluid to the fermentation tank 12.

The controller 150 may control the fluid supply pump 52 based on an amount of fluid supply pre-set or predetermined for the fluid supply operation (S410). The controller 150 may calculate an amount of supplied fluid based on a flow velocity and a flow rate detected through the flow rate detection sensor 53, and when the calculated amount of supplied fluid reaches the pre-set or predetermined amount of fluid supply, the controller 150 may complete the fluid supply operation (S410). When the fluid supply operation (S410) is completed, the controller 150 may turn off the fluid supply pump 52.

The beverage maker may perform an ingredient inputting operation (S420) of putting the ingredient(s) contained in the ingredient supplier 3 into the fermentation tank 12. At the ingredient inputting operation (S420), the controller 150 may turn on the fluid supply pump 52. When the fluid supply pump 52 is turned on, the fluid of the fluid tank 51 may be supplied to the ingredient supplier 3. The fluid supplied to the ingredient supplier 3 may be put into the fermentation tank 12 along with the ingredient(s) contained in the ingredient accommodator 31.

The controller 150 may control the fluid supply pump 52 based on an amount of fluid supply pre-set or predetermined for the ingredient inputting operation (S420). The controller 150 may calculate an amount of supplied fluid based on a flow velocity and a flow rate detected through the flow rate detection sensor 53, and when the calculated amount of supplied fluid reaches the pre-set or predetermined amount of fluid supply, the controller 150 may complete the ingredient inputting operation S420. When the ingredient inputting operation (S420) is completed, the controller 150 may turn off the fluid supply pump 52. That is, the fluid supply operation S410 and the ingredient inputting operation (S420) out of the control operations related to the making of the beverage (beer) may correspond to control operations requiring supply of fluid.

After the ingredient inputting operation (S420) is completed, the beverage maker may make the beverage through a fermentation operation (S430) and an aging operation 9S440). The fermentation operation (S430) and the aging operation (S440) may correspond to control operations which do not require supply of fluid.

The fermentation operation (S430) may be an operation of generating alcohol and carbonic acid contained in the beverage, and the aging operation (S440) may be an operation for enhancing flavor or taste of the made beverage, and may not necessarily be performed. When the aging operation (S440) is completed, the making of the beverage may be completed.

The beverage maker may perform a beverage dispensing operation (S450) of dispensing the beverage after completing the making of the beverage. In the beverage dispensing operation (S450), the beverage maker may dispense the beverage by a user's operation of the lever 61 of the beverage dispenser 6. When the lever 61 is operated, the beverage in the fermentation tank 12 may pass through a channel between the fermentation module 1 and the beverage dispenser 6, and may be dispensed to the outside through the beverage dispenser 6.

When all of the beverage in the fermentation tank 12 is dispensed and the controller 150 determines that beverage dispensing is completed, the controller 150 may perform the cleaning operation (S460) after dispensing the beverage. The cleaning operation (S460) has been described above, and thus, a detailed description thereof has been omitted.

Figure 5:
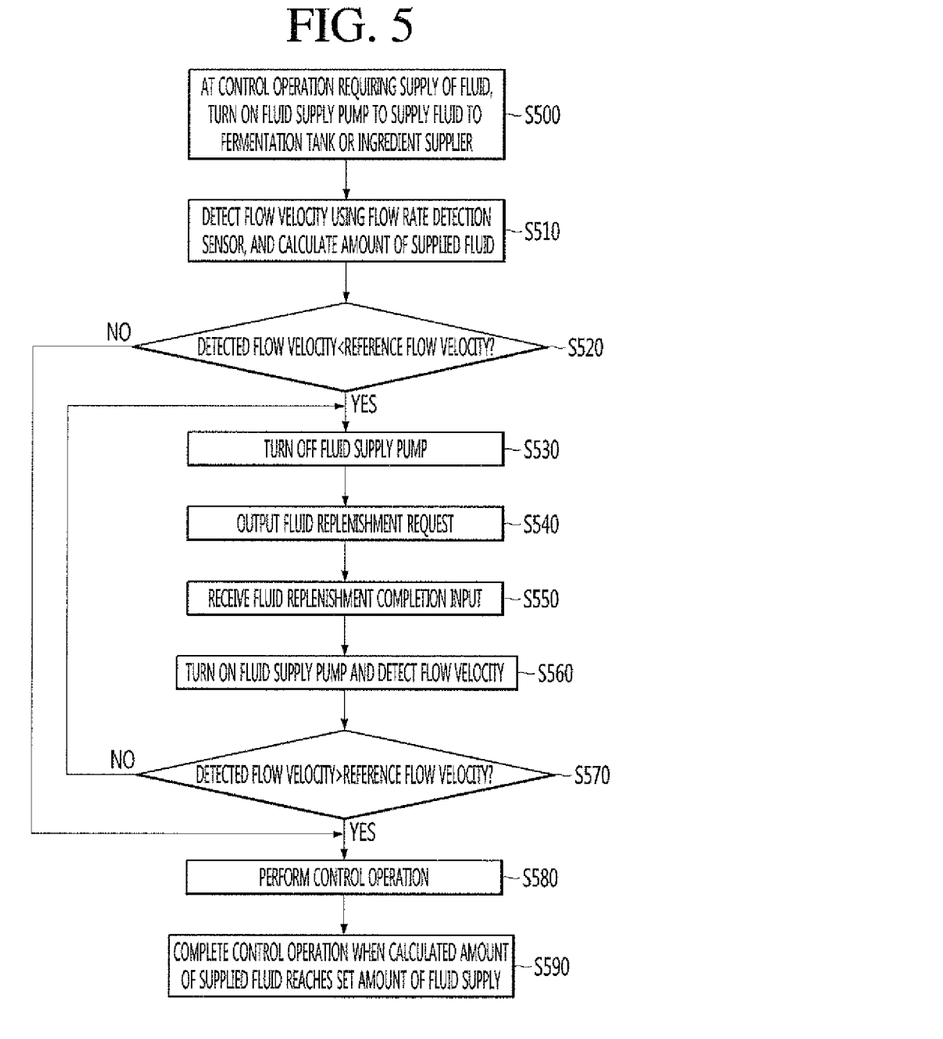
FIG. 5 is a flowchart to explain an operation of detecting a lack of fluid and a corresponding control operation of the beverage maker according to an embodiment.

FIG. 5 is a flowchart to explain an operation of detecting a lack of fluid and a corresponding control operation of the beverage maker according to an embodiment. Referring to FIG. 5, when a control operation requiring supply of fluid is performed during an operation, the beverage maker may turn on the fluid supply pump 52 to supply fluid contained in the fluid tank 51 to the fermentation tank 12 or the ingredient supplier 3 (S500). The control operation requiring supply of fluid may refer to the cleaning operation (S400, S460), the fluid supply operation (S410), and/or the ingredient inputting operation (S420) described above in FIG. 4; however, embodiments are not limited thereto.

When the control operation requiring supply of fluid is initiated, the controller 150 may turn on the fluid supply pump 52 to discharge fluid contained in the fluid tank 51, and may provide the discharged fluid to the fermentation tank 12 or the ingredient supplier 3. For example, in the cleaning operation (S400, S460), the controller 150 may provide fluid pumped by the fluid supply pump 52 to the fermentation tank 12 and/or the ingredient supplier 3. To achieve this, the controller 150 may control a valve disposed between the fluid supply module 5 and the fermentation module 1, and a valve disposed between the fluid supply module 5 and the ingredient supplier 3.

In the fluid supply operation (S410), the controller 150 may provide the fluid pumped by the fluid supply pump 52 to the fermentation tank 12. In the ingredient inputting operation (S420), the controller 150 may provide the fluid pumped by the fluid supply pump 52 to the fermentation tank 12 through the ingredient supplier 3. When the fluid supply pump 52 is turned and fluid is supplied, the beverage maker may detect a flow velocity (or a flow rate) using the flow rate detection sensor 53, and may calculate an amount of supplied fluid based on a result of detecting (S510).

When the fluid supply pump 52 is turned on, fluid contained in the fluid tank 51 may be supplied to the fermentation tank 12 or the ingredient supplier 3. The controller 150 may control the flow rate detection sensor 53, which is installed in a channel connected to the fluid supply pump 52, to detect a flow velocity (or a flow rate) of fluid supplied from the fluid supply module 5.

The controller 150 may calculate the amount of supplied fluid based on the detected flow velocity or flow rate. For example, when a flow velocity is detected from the flow rate detection sensor 53, the controller 150 may calculate a flow rate based on the detected flow velocity and a cross-sectional area of the channel, and may calculate the amount of supplied fluid by adding up the calculated flow rate according to the elapsed time. Alternatively, when a flow rate is detected from the flow rate detection sensor 53, the controller 150 may calculate the amount of supplied fluid by adding up the detected flow rate according to the elapsed time.

In a further operation (S590), which will be described hereinafter, when the calculated amount of supplied fluid reaches an amount of fluid supply which is pre-set or predetermined for the control operation, the controller 150 may complete the control operation. When the calculated amount of supplied fluid does not reach the pre-set or predetermined amount of fluid supply, the beverage maker may detect whether there is a lack of fluid, by comparing the flow velocity (or flow rate) detected by the flow rate detection sensor 52 and a reference flow velocity (or a reference flow rate). When the detected flow velocity is higher than the reference flow velocity (NO in S520), the beverage maker may continue performing the current control operation (S580).

For example, when there is a sufficient amount of fluid in the fluid tank 51, the flow velocity may be higher than the reference flow velocity. On the other hand, when the detected flow velocity is less than or equal to the reference flow velocity (YES in S520), the beverage maker may detect that there is a lack of fluid in the fluid tank 51.

When there is no fluid in the fluid tank 51 or less than a predetermined amount of fluid exists, the flow velocity detected by the flow rate detection sensor 53 may be less than or equal to the reference flow velocity. For example, the reference flow velocity may be "0"; however, embodiments are not limited hereto.

When a sensor, for example, a fluid level sensor, for detecting an amount of remaining fluid is provided in the fluid tank 51, the beverage maker may directly detect whether there is a lack of fluid in the fluid tank 51 through the sensor. When the lack of fluid in the fluid tank 51 is detected, the beverage maker may turn off the fluid supply pump 52 (S530).

When there is the lack of fluid in the fluid tank 51, the pre-set or predetermined amount of fluid is not supplied and the control operation may not be normally performed. Accordingly, a quality of the beverage made in the beverage maker may be degraded or a hygiene problem may arise inside of the beverage maker. Accordingly, when the lack of fluid in the fluid tank 51 is detected, the beverage maker may stop performing the control operation until the fluid is replenished, such that the above-described problems may be minimized.

When the fluid supply pump 52 is turned off or after the fluid supply pump 52 is turned off, the beverage maker may generate and output a fluid replenishment request to induce the user to replenish the fluid tank 51 with fluid (540). The controller 150 may output the generated fluid replenishment request through the output interface 130, such as the display 132 or the speaker 134. The user may replenish the fluid tank 51 with fluid according to the output fluid replenishment request.

According to an embodiment, the controller 150 may further output information regarding an amount of fluid to be replenished. The controller 150 may calculate the amount of fluid to be replenished, based on a difference between the amount of supplied fluid calculated based on the flow velocity (or flow rate) detected through the flow rate detection sensor 53, and the amount of fluid supply pre-set or predetermined for the current control operation. According to an embodiment, the controller 150 may transmit the fluid replenishment request to a terminal of the user or a server through the communication interface 110.

The beverage maker may receive a fluid replenishment completion input from the user (S550). When the fluid replenishment completion input is received, the beverage maker may turn on the fluid supply pump 52, and may detect whether the fluid is normally replenished by detecting a flow velocity using the flow rate detection sensor 52 (S560).

After replenishing the fluid tank 51 with fluid, the user may perform an input operation indicating completion of fluid replenishment through the input interface 120. According to the input operation, the controller 150 may receive the fluid replenishment completion input.

When the fluid replenishment completion input is received, the controller 150 may turn on the fluid supply pump 52 and may detect a flow velocity using the flow rate detection sensor 53 in order to check whether the fluid tank 52 is normally replenished with fluid. When the detected flow velocity is higher than a reference flow velocity (YES in S570), the beverage maker may detect that the fluid tank 51 is normally replenished with fluid, and may resume the control operation which has been stopped and perform the control operation (S580).

The beverage maker may calculate an amount of supplied fluid while continuing the control operation, and when the calculated amount of supplied fluid reaches the pre-set or predetermined amount of fluid supply, the beverage maker may complete the control operation (S590). The controller 150 may determine whether a sum of the amount of supplied fluid calculated before the control operation is stopped, and the amount of supplied fluid calculated after the control operation is resumed reaches the pre-set or predetermined amount of fluid supply. According to an embodiment, the controller 150 may determine whether a sum of the amount of supplied fluid calculated before the control operation is stopped, the amount of fluid supplied while it is determined whether fluid is replenished according to operation (S560), and the amount of supplied fluid calculated after the control operation is resumed reaches the pre-set or predetermined amount of fluid supply. On the other hand, when the detected flow velocity is lower than the reference flow velocity (NO in S570), the beverage maker may detect that the fluid tank 51 is not replenished with fluid. In this case, the beverage maker may turn off the fluid supply pump 52 again (S530), and may re-output the fluid replenishment request (S540).

After the fluid replenishment request is output (S540), the fluid replenishment completion input may not be received from the user for a predetermined period of time, although not illustrated. For example, when the user is absent or does not check the state of the beverage maker, the user may miss the fluid replenishment request. Accordingly, the user may not replenish the fluid tank 51 with fluid.

In particular, when the predetermined period of time has elapsed at the control operation related to the making of the beverage, the quality of the made beverage may be degraded even if the control operation is resumed. In addition, when the predetermined period of time has elapsed, the quality of the beverage which is being made may be changed and the beverage may be unfit for drinking.

Accordingly, when the fluid replenishment completion input is not received for a predetermined period of time after the fluid replenishment request output, the beverage maker may turn on the fluid supply pump 52 and may control the flow rate detection sensor 53 to check whether fluid is replenished. When the fluid is not replenished as a result of checking, the beverage maker may cancel the making of the beverage, and may induce to discard the beverage which is being made, such that damage or declining satisfaction caused by drinking the beverage the quality of which is degraded or changed may be prevented.

Figure 6:
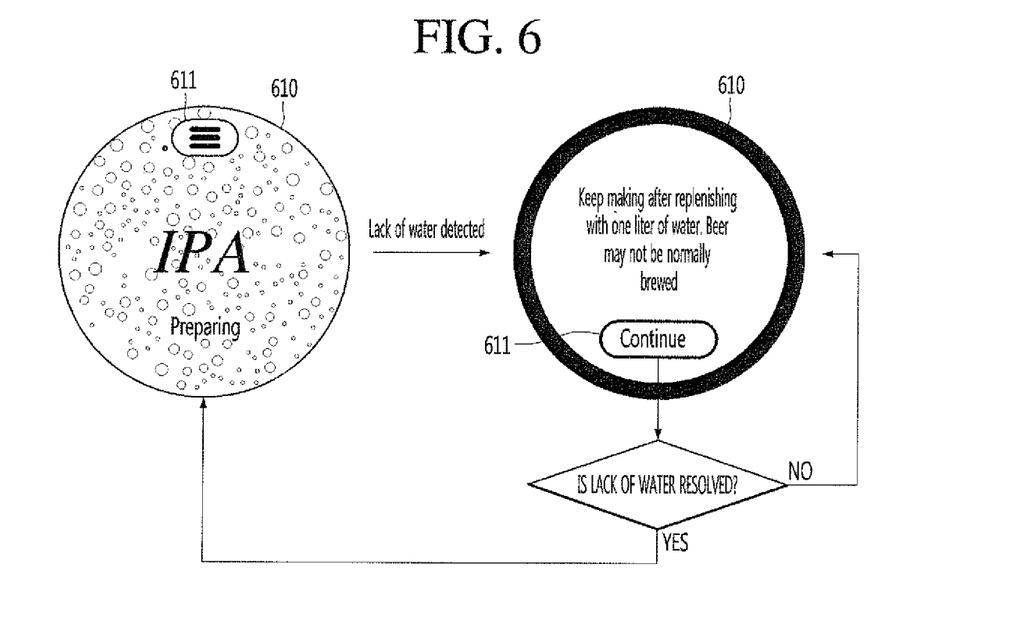
FIG. 6 is a view showing an example of an operation of the beverage maker when a lack of fluid is detected during a control operation related to making of a beverage.

FIG. 6 is a view showing an example of an operation of the beverage maker when a lack of fluid is detected during a control operation related to making of a beverage. Referring to FIG. 6, the beverage maker may perform control operations related to making of a beverage according to a request for execution of the beverage making function received from a user.

When an ingredient is received in the ingredient supplier 3 and/or the fermentation module 1 by the user, and fluid is received in the fluid tank 51, the beverage maker may perform beverage making preparation operations for making the beverage. For example, the beverage making preparation operations may include the fluid supply operation (S410) and the ingredient inputting operation (420) described above in FIG. 4; however, embodiments are not limited thereto.

The controller 150 may display a beverage making preparation screen 600, indicating that making of the beverage is being prepared, through the display 132 while performing the beverage making preparation operations. For example, the beverage making preparation screen 600 may include a graphic image indicating a beverage name or recipe name, characteristics of the beverage, such as color, or a degree of carbonic acid, for example, as information related to the beverage to be made, and a menu item 601 for going into a menu.

The controller 150 may detect whether there is a lack of fluid in the fluid tank 51 as described above in FIG. 5, when performing the control operation requiring supply of fluid, for example, the fluid supply operation (S410) or the ingredient inputting operation (S420), from among the beverage making preparation operations.

When the lack of fluid in the fluid tank 51 is detected, the controller 51 may display a fluid replenishment request screen 610 to induce the user to replenish the fluid tank 51 with fluid through the display 132. In addition, as described above in FIG. 5, the controller 150 may turn off the fluid supply pump 52 and may stop the ongoing control operation.

For example, the fluid replenishment request screen 610 may include a message for inducing replenishment of fluid, and a fluid replenishment completion item 611. According to an embodiment, the message may further include information regarding an amount of fluid to be replenished, based on a difference between an amount of supplied fluid calculated at the control operation, and an amount of fluid supply pre-set or predetermined for the control operation.

The controller 150 may further output a voice or a sound for inducing replenishment of fluid through the speaker 134. For example, when the user does not or cannot view or see the beverage maker, the user may recognize that it is necessary to replenish with fluid based on the voice or sound output through the speaker 134.

After replenishing the fluid tank 51 with fluid, the user may select the fluid replenishment completion item 611 by operating the input interface 120, for example, the rotary knob 122. When the fluid replenishment completion item 611 is selected, the controller 150 may receive the fluid replenishment completion input (S550) of FIG. 5.

When the fluid replenishment completion input is received through the fluid replenishment request screen 610, the controller 150 may determine whether the lack of fluid in the fluid tank 51 is resolved as described above (S560) of FIG. 5. When the lack of fluid is resolved, the controller 150 may resume the stopped control operation and may display the preparation screen 600 on the display 132 again. On the other hand, when the lack of fluid is not resolved, the controller 150 may maintain the stopped state of the control operation, and may display the fluid replenishment request screen 610 on the display 132.

When the lack of fluid in the fluid tank 51 is detected, the controller 150 may transmit the fluid replenishment request to a terminal of the user through the communication interface 110. According to an embodiment, when the fluid replenishment completion input is not received for a predetermined period of time after the fluid replenishment request is output through the display 132 and/or the speaker 134, the controller 150 may transmit the fluid replenishment request to the terminal.

When the fluid replenishment completion input is not received for a predetermined period of time after the fluid replenishment request is output or is transmitted to the terminal, the controller 150 may cancel the making of the beverage. In this case, the controller 150 may output a discard request to induce the user to discard the ingredient and the fluid contained in the fermentation tank 12 through the output interface 130. The controller may detect the lack of fluid in the fluid tank 51 while performing the ingredient inputting operation (S420), and may output the fluid replenishment request based on the result of detecting through the output interface 130 or may transmit the fluid replenishment request to the terminal.

Figure 7:
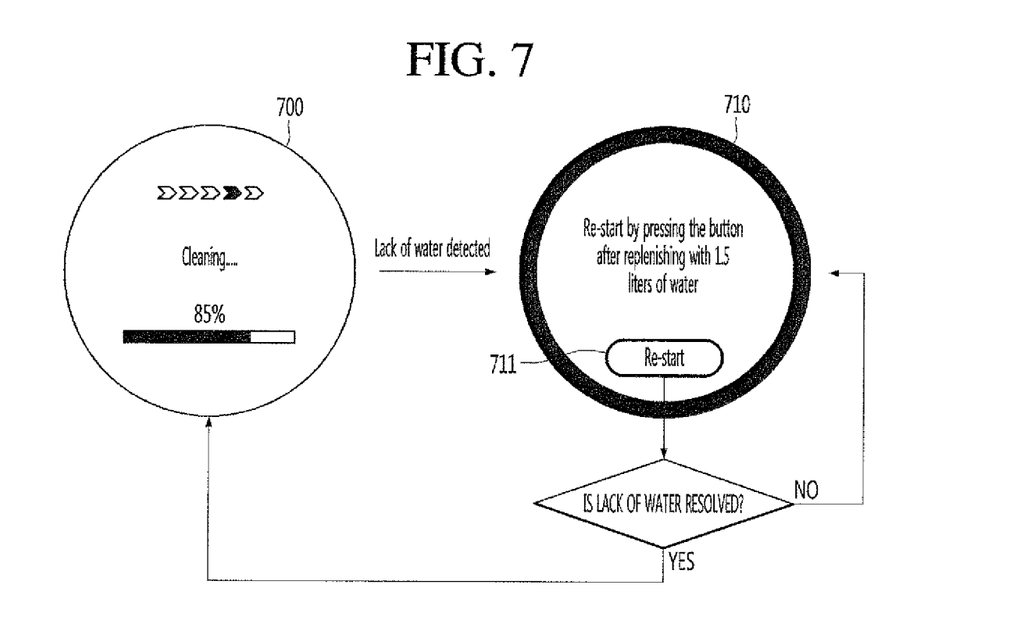
FIG. 7 is a view showing an example of an operation of the beverage maker when a lack of fluid is detected during a cleaning operation.

FIG. 7 is a view illustrating an example of an operation of the beverage maker when a lack of fluid is detected during a cleaning operation. Referring to FIG. 7, the beverage maker may perform the cleaning operation for channels and components in the beverage maker when a cleaning request is received from a user, or based on a predetermined cleaning condition (after a beverage is dispensed, or before a beverage is made).

In the cleaning operation, the controller 150 may supply fluid contained in the fluid tank 51 to the channels and the components. The supplied fluid may be mixed with foreign substances or residue existing in the channels and on the components, and may be discharged to the outside through the beverage dispenser 6 or may be received in a cleaning container in the fermentation tank 12.

In addition, while performing the cleaning operation, the controller 150 may display a cleaning state screen 700 indicating that cleaning is ongoing in the beverage maker through the display 132. For example, the cleaning state screen 700 may include information related to cleaning, such as a progress of cleaning, and/or information on a channel or a component which is being cleaned, for example.

The controller 150 may detect whether there is a lack of fluid in the fluid tank 51 while performing the cleaning operation, as described above in FIG. 5. When the lack of fluid in the fluid tank 51 is detected, the controller 150 may display a fluid replenishment request screen 710 to induce the user to replenish the fluid tank 51 with fluid through the display 132. In addition, the controller 150 may turn off the fluid supply pump 52 as described above in FIG. 5, and may stop the ongoing cleaning operation.

Similarly to the fluid replenishment request screen 610 shown in FIG. 6, the fluid replenishment request screen 710 may include a message for inducing replenishment of fluid, and a fluid replenishment completion item 711. According to an embodiment, the message may further include information on an amount of fluid to be replenished based on a difference between an amount of supplied fluid calculated during the cleaning operation, and an amount of fluid supply pre-set or predetermined for the cleaning operation.

In addition, the controller 150 may further output a voice or a sound for inducing replenishment of fluid through the speaker 134. For example, when the user does not or cannot view or see the beverage maker, the user may recognize that it is necessary to replenish with fluid based on the voice or sound output through the speaker 134.

After replenishing the fluid tank 51 with fluid, the user may select the fluid replenishment completion item 711 by operating the input interface 120, for example, the rotary knob 122, When the fluid replenishment completion item 711 is selected, the controller 150 may receive the fluid replenishment completion input as described (S550 of FIG. 5).

When the fluid replenishment completion input is received through the fluid replenishment request screen 710, the controller 150 may determine whether the lack of fluid in the fluid tank 51 is resolved (S560 of FIG. 5) as described above. When the lack of fluid is resolved, the controller 150 may resume the stopped cleaning operation and may display the cleaning state screen 700 on the display 132 again.

On the other hand, when the lack of fluid is not resolved, the controller 150 may maintain the stopped state of the cleaning operation and may display the fluid replenishment request screen 710 on the display 132. When the lack of fluid in the fluid tank 51 is detected, the controller 150 may transmit the fluid replenishment request to the terminal of the user through the communication interface 110. According to an embodiment, when the fluid replenishment completion input is not received for a predetermined period of time after the fluid replenishment request is output through the display 132 and/or the speaker 134, the controller 150 may transmit the fluid replenishment request to the terminal.

When the fluid replenishment completion input is not received for a predetermined period of time after the fluid replenishment request is output or transmitted to the terminal, the controller 150 may forcedly finish the cleaning operation. When the cleaning operation is forcedly finished, fluid existing in the channels and/or components in the beverage maker may be discharged to the outside. Thereafter, when a user's intention of using the beverage maker is detected, the controller 150 may notify that the previous cleaning operation has not been normally performed through the output interface 130, and may perform the cleaning operation again.

That is, according to the embodiment shown in FIGS. 5 to 7, the beverage maker may detect the lack of fluid in the fluid tank while performing the control operation requiring supply of fluid, and automatically stop the control operation, such that degradation of quality of the beverage or poor hygiene caused by continuous performance of the control operation may be minimized. In addition, the user is not required to directly check an amount of remaining fluid to replenish the fluid tank of the beverage maker with fluid, and may replenish the fluid tank with fluid only when a fluid replenishment request is received from the beverage maker. Therefore, the user may easily use the beverage maker.

Further, the beverage maker may calculate an amount of fluid to be replenished and notify the user of this amount, thereby inducing the user to add an appropriate amount of fluid. Accordingly, waste caused by addition of an excessive amount of fluid, or frequent stop or abnormal performance caused by addition of a small amount of fluid may be prevented.

Embodiments disclosed herein provide a beverage maker which detects whether there is a lack of fluid contained in a fluid tank at a control operation requiring supply of fluid from among control operations performed by the beverage maker. Embodiments disclosed herein also provide a beverage maker which, when a lack of fluid is detected at a control operation requiring supply of fluid, may prevent degradation of quality of a beverage or poor hygiene caused by the lack of fluid.

A beverage maker according to an embodiment may turn on a fluid supply pump to discharge fluid contained in a fluid tank when a control operation requiring supply of fluid is ongoing from among a plurality of control operations related to making of a beverage or cleaning of an inside of the beverage maker, and may generate and output a fluid replenishment request for the fluid tank based on a flow velocity or a flow rate detected by the flow rate detection sensor. Accordingly, user inconvenience of having to directly check an amount of fluid remaining in the fluid tank may be resolved.

When a lack of fluid in the fluid tank is detected, the beverage maker may stop the ongoing control operation, and when a fluid replenishment completion input is received and it is determined that fluid is replenished through the flow rate detection sensor, the beverage maker may resume the stopped control operation. Accordingly, problems that a beverage is abnormally made or poor hygiene is caused in the beverage maker due to continuous performance of the control operation although there is a lack of fluid in the fluid tank may be minimized.

The beverage maker may calculate an amount of supplied fluid based on a flow velocity or a flow rate detected by the flow rate detection sensor. When the lack of fluid in the fluid tank is detected, the beverage maker may provide information on an amount of fluid to be replenished, based on a difference between the calculated amount of supplied fluid and an amount of fluid supply pre-set or predetermined for the control operation. When a fluid replenishment completion input is not received for a predetermined period of time after the fluid replenishment request is output, the beverage maker may cancel the making of the beverage or automatically finish a cleaning operation.

The details of one or more embodiments are set forth in the accompanying drawings and the description. Other features will be apparent from the description and drawings, and from the claims.

The above-disclosed subject matter is to be considered illustrative, and not restrictive, and the appended claims are intended to cover all such modifications, enhancements, and other implementations, which fall within the scope. Thus, the implementation is to be considered illustrative, and not restrictive. Therefore, the scope is defined not by the detailed description but by the appended claims, and all differences within the scope will be construed as being included.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
   a fermenter having a space therein to make a beverage;
   a fluid tank configured to contain fluid;
   a fluid supply pump connected with the fluid tank;
   a flow rate detection sensor disposed in a channel connected with the fluid supply pump to detect a flow velocity or a flow rate of fluid which is discharged through the channel by the fluid supply pump;
   an output interface configured to output the generated fluid replenishment request;
   an input interface configured to receive a fluid replenishment completion input based on the fluid replenishment request output through the output interface; and
   a controller configured to perform a plurality of operations related to making of a beverage or cleaning of an inside of the beverage maker, wherein the controller is configured to:
      when an operation requiring a supply of fluid is ongoing from among the plurality of operations, turn on the fluid supply pump to discharge fluid contained in the fluid tank;
      detect a lack of fluid in the fluid tank based on a first flow velocity or a first flow rate detected by the flow rate detection sensor;
      generate a fluid replenishment request for the fluid tank based on a result of detecting;
      when the lack of fluid in the fluid tank is detected, turn off the fluid supply pump and stop the ongoing operation;
      when the fluid replenishment completion input based on the output fluid replenishment request is received, turn on the fluid supply pump; and
      resume the operation based on a second flow velocity or a second flow rate detected by the flow rate detection sensor.

2. The beverage maker of claim 1, wherein when the first flow velocity or the first flow rate is less than a reference flow velocity or a reference flow rate, the controller is configured to detect the lack of fluid in the fluid tank.

3. The beverage maker of claim 1, wherein the controller is configured to:
   calculate an amount of fluid supplied in the operation, based on the first flow velocity or the first flow rate; and
   when the lack of fluid in the fluid tank is detected, generate the fluid replenishment request comprising an amount of fluid to be replenished, which is based on a difference between the calculated amount of supplied fluid and a fluid supply predetermined for the operation.

4. The beverage maker of claim 1, wherein the output interface comprises at least one of a display or a speaker.

5. The beverage maker of claim 1, wherein when the second flow velocity or the second flow rate is higher than a reference flow velocity or a reference flow rate, the controller is configured to resume the control operation.

6. The beverage maker of claim 4, wherein the ongoing control operation is a control operation related to the making of the beverage, and wherein when the fluid replenishment completion input is not received for a predetermined time from a time at which the fluid replenishment request is output through the output interface, the controller is configured to cancel the making of the beverage.

7. The beverage maker of claim 4, wherein the ongoing operation is a cleaning operation of an inside of the beverage maker, and wherein when the fluid replenishment completion input is not received for a predetermined period of time from a time at which the fluid replenishment request is output through the output interface, the controller is configured to finish the cleaning operation.

8. The beverage maker of claim 4, further comprising a communication interface configured to connect to a terminal, wherein the controller is configured to control the communication interface to transmit the fluid replenishment request to the terminal.

9. The beverage maker of claim 8, wherein when the fluid replenishment completion input is not received for a predetermined period of time from a time at which the fluid replenishment request is output through the output interface, the controller is configured to control the communication interface to transmit the fluid replenishment request to the terminal.

10. A method for controlling a beverage maker, the method comprising:
    when an operation requiring a supply of fluid is ongoing from among a plurality of operations related to making of a beverage or cleaning of the beverage maker, turning on a fluid supply pump to supply fluid contained in a fluid tank to a fermenter or an ingredient supplier;
    detecting a first flow velocity or a first flow rate using a flow rate detection sensor disposed in a channel connected with the fluid supply pump;
    detecting a lack of fluid in the fluid tank based on the detected first flow velocity or first flow rate; and
    when the lack of fluid is detected, outputting a fluid replenishment request for the fluid tank, wherein the outputting of the fluid replenishment request comprises:
       calculating an amount of fluid supplied at the ongoing operation, based on the detected first flow velocity or first flow rate;
       calculating an amount of fluid to be replenished, based on a difference between the calculated amount of supplied fluid and a fluid supply predetermined for the control operation; and
       outputting the fluid replenishment request including information on the calculated amount of fluid to be replenished.

11. The method of claim 10, wherein the detecting the lack of fluid in the fluid tank comprises detecting the lack of fluid in the fluid tank when the detected first flow velocity or first flow rate is less than a reference flow velocity or a reference flow rate.

12. The method of claim 10, further comprising:
when the lack of fluid is detected, turning off the fluid supply pump and stopping the ongoing operation;
receiving a fluid replenishment completion input based on the output fluid replenishment request; and
turning on the fluid supply pump based on the received fluid replenishment completion input, and resuming the operation based on a second flow velocity or a second flow rate detected by the flow rate detection sensor.

13. The method of claim 12, wherein the resuming the operation comprises resuming the operation when the second flow velocity or the second flow rate is higher than a reference flow velocity or a reference flow rate.

14. The method of claim 10, wherein the ongoing operation is an operation related to the making of the beverage, and wherein the method further comprises when the fluid replenishment completion input is not received for a predetermined period of time from a time at which the fluid replenishment request is output, canceling the making of the beverage.

15. The method of claim 10, wherein the ongoing operation is a cleaning operation of an inside of the beverage maker, and wherein the method further comprises when the fluid replenishment completion input is not received for a predetermined period of time from a time at which the fluid replenishment request is output, finishing the cleaning operation.

16. A beverage maker, comprising:
a fluid tank;
a fluid supply pump in communication with the fluid tank;
a flow rate detection sensor disposed in a channel connected with the fluid supply pump to detect a flow velocity or a flow rate of fluid which is discharged through the channel by the fluid supply pump;
an output interface configured to output the generated fluid replenishment request;
an input interface configured to receive a fluid replenishment completion input based on the fluid replenishment request output through the output interface; and
a controller configured to control a plurality of operations related to making of a beverage or cleaning of an inside of the beverage maker, wherein the controller is configured to:
when an operation requiring a supply of fluid is ongoing from among the plurality of operations, turn on the fluid supply pump to discharge fluid contained in the fluid tank;
detect a lack of fluid in the fluid tank based on a first flow velocity or a first flow rate detected by the flow rate detection sensor;
generate a fluid replenishment request for the fluid tank based on a result of detecting;
when the lack of fluid in the fluid tank is detected, turn off the fluid supply pump and stop the ongoing operation;
when the fluid replenishment completion input based on the output fluid replenishment request is received, turn on the fluid supply pump; and
resume the operation based on a second flow velocity or a second flow rate detected by the flow rate detection sensor.

17. The beverage maker of claim 16, wherein when the first flow velocity or the first flow rate is less than a reference flow velocity or a reference flow rate, the controller is configured to detect the lack of fluid in the fluid tank.

18. The beverage maker of claim 16, wherein the controller is configured to:
calculate an amount of fluid supplied in the operation, based on the first flow velocity or the first flow rate; and
when the lack of fluid in the fluid tank is detected, generate the fluid replenishment request comprising an amount of fluid to be replenished, which is based on a difference between the calculated amount of supplied fluid and a fluid supply predetermined for the operation.

* * * * *